United States Patent [19]
Lohberg et al.

[11] Patent Number: 5,464,079
[45] Date of Patent: Nov. 7, 1995

[54] TWO-TUBE SHOCK ABSORBER

[75] Inventors: Peter Lohberg, Friedrichsdorf; Ronald Bayer, Mühlheim/Main2; Siegfried Halat, Frankfurt am Main; Dieter Kircher, Dortelweil; Diogenes Perez, Frankfurt am Main; Stefan Sparschuh, Saulheim, all of Germany

[73] Assignee: Alfred Teves GmbH, Germany

[21] Appl. No.: 117,137

[22] PCT Filed: Mar. 10, 1992

[86] PCT No.: PCT/EP92/00520

§ 371 Date: Sep. 13, 1993

§ 102(e) Date: Sep. 13, 1993

[87] PCT Pub. No.: WO92/16772

PCT Pub. Date: Oct. 1, 1992

[30] Foreign Application Priority Data

Mar. 13, 1991 [DE] Germany .......................... 41 08 027.0
Nov. 14, 1991 [DE] Germany .......................... 41 37 403.7

[51] Int. Cl.⁶ ................................ B60G 17/08; F16F 9/46
[52] U.S. Cl. ...................... 188/315; 188/280; 188/322.14
[58] Field of Search ...................... 188/311, 312, 188/313, 314, 316, 317, 315, 322.14, 322.15, 275, 279, 281, 282, 297, 285, 380, 280; 267/217

[56] References Cited

U.S. PATENT DOCUMENTS

| | | | |
|---|---|---|---|
| 3,874,485 | 4/1975 | Smith | 188/315 X |
| 4,597,411 | 7/1986 | Lizell | 188/322.14 X |

FOREIGN PATENT DOCUMENTS

| | | | |
|---|---|---|---|
| 1081439 | 12/1954 | France | 188/315 |
| 0682978 | 11/1952 | United Kingdom | 188/315 |
| 0699949 | 11/1953 | United Kingdom | 188/282 |
| WO8909891 | 10/1989 | WIPO | 188/322.14 |

*Primary Examiner*—Robert J. Oberleitner
*Assistant Examiner*—Peter M. Poon
*Attorney, Agent, or Firm*—Dykema Gossett

[57] ABSTRACT

A two-tube shock absorber for automotive vehicles is furnished with a shock absorber valve positioned at the lower end of its power cylinder and comprising a pilot control stage, a main stage to adjust its "soft" characteristic curve which is desired for reasons of driving comfort, or a special characteristic curve out of a field of potential characteristic curves. According to the invention, in a lower range of piston speed the shock absorbing power is determined exclusively by the variable cross-sectional area of flow of the pilot control stage wherein the main stage remains closed. In an upper range of piston speed the shock absorbing power is determined by the variable flow cross-sectional areas both of the main stage and of the pilot control stage.

28 Claims, 8 Drawing Sheets

TWO-TUBE SHOCK ABSORBER

TECHNICAL FIELD

The invention is related to a controllable two-tube shock absorber with controllable variable shock absorbing power for automotive vehicles, and more particularly relates to shock absorbers comprised of a power cylinder wherein the interior space is subdivided into a first and a second power chambers by means of a piston slidable by a piston rod; storage tank partly filled with oil, wherein hydraulic connections afford a compensation of volume between the power chambers and the storage tank.

BACKGROUND OF THE INVENTION

A two-tube shock absorber of this kind is known from the international patent application No. WO 89/09891. A particular feature of this prior art two-tube shock absorber is its shock absorbing power that is predetermined exclusively by means of a two-stage controllable shock absorber valve which is disposed at the lower end of the central tube and through which the fluid flows in one direction only. With this arrangement, the pilot control stage of the shock absorber valve serves exclusively to control the main stage wherein the flow cross-sectional area determines the variance of absorbing power.

In the state of the art controllable shock absorber however, a disadvantage is that beyond the electromagnetic actuating power at the pilot control stage a minimum hydraulic pressure is required in the system in order to safeguard the functioning of the shock absorber in the customary range of application. Furthermore, the control times which are achievable by this arrangement and which are too long for a quick-acting shock absorber system are less advantageous. The "soft" characteristic and the quick adjustability, which are desired for driving comfort, cannot be attained for the aforementioned reasons.

It is, therefore, the object of the present invention to provide a two-tube shock absorber of the kind discussed which overcomes the aforementioned disadvantages. Moreover, a two-tube shock absorber is provided which affords the adjustment of a special desired characteristic, wherein the shock absorbing power is dependent on the piston speed, out of a field of potential characteristic curves.

According to the invention this object is achieved in that in a lower range of piston speed the shock absorbing power is exclusively determined by the variable flow cross-sectional area of the pilot control stage, while the main stage remains closed, and in that in an upper range of piston speed the shock absorbing power is determined by the variable flow cross-sectional areas both in the main stage and in the pilot control stage.

With this arrangement, it is of advantage that in the upper range of piston speed the main stage follows the position of the pilot control stage. Due to this provision, a more elevated dynamic ratio of the valve adjustment jointly with a simultaneous reduction of the vibration tendency of the shock absorber, particularly when utilized in a moving gear control process, is achieved.

A further advantage of this invention is that the main stage as well as the pilot control stage are arranged so as to be separate from the second non-return valve in a valve housing, wherein the main stage includes a main slide valve interacting with a control edge which is configured within the valve housing. The pilot control stage includes an electromagnetically actuatable control slide valve interacting with control bores which are provided in the main slide valve. A shock absorber valve having this set-up and presenting a two-stage configuration requires less actuating capacity, and affords a better handling of more elevated absorbing power levels.

The control edge is preferably positioned in proximity to the flow-off bores which are configured in the valve housing and which are used in connection with the storage tank. The flow-off bore's size and geometric shape influence the performance characteristics of the main stage. In its upper part, the main slide valve is configured open and is furnished with slide valve bores which allow the bores to be brought into connection with the flow-off bores.

According to another preferred embodiment of the invention, the main slide valve is prestressed in the closing direction of the main stage by means of an optimum first compression spring. The main slide valve is in abutment against a stop. The first compression spring assists the closing of the main stage.

Any suction or displacement problems at the main slide valve which occur during the operation of the inventive shock absorber are preferably eliminated if the abutment of the main slide valve at the stop includes axial projections.

A further advantage of the invention is that the main slide valve is provided with restricting bores which end up in a hydraulic chamber defined within the valve housing by the main slide valve. Due to this provision, both a smooth oil supply for the pilot control stage is attained and pressure drops in the event of the passage through said restricting bores is attained, which are of vital importance for regular functioning.

An advantageous coupling of the main stage to the pilot control stage is attained in another embodiment of the invention. The control slide valve is guided in the main slide valve and may be abutted against it under the prestressing action by a second compression spring.

A particularly advantageous embodiment of the invention includes a pilot control stage which is electromagnetically actuatable by a plunger coil interacting with a permanent magnet. This embodiment comprises a control slide valve captivated to the plunger coil support by means of a captivating element wherein the captivating element head may be in abutment against the main slide valve. Due to this provision, an exact control of the absorbing power in the lower range of the piston speed and an adjustability of the shock absorber valve and, as a consequence, variations of the absorbing power are rendered possible. Simultaneously, a swinging of the control slide valve over the control bores is prevented. In this embodiment, the favorable dynamic behavior of the plunger coil is of particular advantage.

According to another preferred embodiment, the actuating unit is comprised of the plunger coil and of the permanent magnet positioned in a hydraulic chamber which is in connection with the storage tank, so that an end of the captivating element, which is fixed to the plunger coil support, is subject to the action of the pressure existing within the storage tank. The aim achieved is that the plunger coil does not undergo the pressure which exists in the storage tank. Simultaneously, the effect of a downwardly directed force is applied on the captivating element.

In the event of a failure or of faulty control of the shock absorber valve to prevent an inadmissibly elevated absorbing power in the pressure stage, a non-controllable valve is provided along the lines of the invention parallel to the main stage, or the pilot control stage, which is active exclusively in the pressure stage of the shock absorber.

In this embodiment, the valve is preferably configured in the range of the second non-return valve, and comprised of a ball interacting with a valve seat and being prestressed by a spring, and, as already discussed above, becomes effective exclusively in the pressure stage.

This embodiment will be of further advantage when the valve is arranged in a connection between the second chamber and the storage tank which is formed by bores in a disc-shaped part of the second non-return valve. In the valve housing, the bore which is provided aligns with one of the flow-off bores. The aim achieved by this inventive provision is that the volumetric stream flowing through the valve is led into the already existing storage tank, so that no additional oil reservoir will be necessary.

According to a further advantage of the invention, the electromagnetic actuation of the pilot control stage takes place by means of a proportional magnet whose armature is connected to the control slide valve by means of a captivating element, wherein the head of the captivating element is abutted against the main slide valve. The advantage of this arrangement is seen in the favorable ratio between the maximum magnetic force Fmax supplied and the required overall space, or the required mass.

According to another preferred embodiment of the invention, the main stage as well as the pilot control stage are arranged within a valve housing so as to be separate from the second non-return valve. The main stage includes a valve piston interacting with a sealing seat which is configured as a disc-shaped element of the second non-return valve. The pilot control stage includes an electromagnetically actuatable control slide valve interacting with control bores which are configured in the valve piston. The use of a seat valve having such a set-up aids in overcoming soiling problems which occur in the system.

Furthermore, it will be of advantage when the disc-shaped element jointly with the valve housing defines a hydraulic annular chamber into which the valve piston projects and which is in connection with the storage tank. The above-mentioned control bores ends up in the annular chamber. These provisions provide a simple way to combine the main stage stream and the pilot control stage stream and to convey them into a common storage tank.

Other advantages of the invention are that the main stage as well as the pilot control stage are positioned within a valve housing so as to be separate from the second non-return valve. The main stage includes a piston which is sealedly guided within the valve housing, which bears a valve closing plate and which is furnished with an axial bore. The valve housing includes a sealing seat which allows the main stage to be shut off and released by the valve closing plate and which is configured as a disc-shaped element of the second non-return valve. The pilot control stage includes a cylindrical chamber configured in the valve housing. The cylindrical chamber accommodates a control slide valve elastically prestressed in the closing direction. An axially extending cylindrical wall is provided with radial bores which interact with control bores configured in the control slide valve and which afford a hydraulic link between a chamber being defined by the piston within the valve housing, on one hand, and the storage tank, on the other hand. This arrangement allows a flow through the pilot control stage at a right angle to the direction of movement of the control slide valve, even when the valve is wide open, since the position of the pilot control stage is influenced only to a slight extent.

When the pilot control stage is actuatable electromagnetically, and the control slide valve is configured with the support of a plunger coil which comprises part of the electromagnetic actuating device, a direct control of the shock absorber valve in the lower range of piston speed will be attained.

An increase of the quality of the control process is achieved in a preferred embodiment wherein a wall is provided which defines the cylindrical chamber. The wall extends in horizontal direction and includes a stepped bore wherein a section having a smaller diameter is in the chamber and wherein a section having a larger diameter accommodates an axially slidable thrust member which interacts with the front face of the control slide valve.

As an alternative, an intermediate position of the control slide valve in the condition of rest may be provided in which a partial connection is established between the chamber which is defined within the valve housing by the main slide valve, or by the valve piston, on one hand, and the storage tank, on the other hand. The intermediate position of the control slide valve is achieved by a third compression spring which counteracts the second compression spring prestressing the control slide valve.

A compact design is, finally, achieved in the aforementioned two-tube shock absorber in that the third compression spring is supported at the horizontal wall defining the cylindrical chamber.

In a further feature of the invention, an electromagnetic actuating unit for the shock absorber valve of the inventive controllable two-tube vibration absorber is disclosed which comprises a closed magnet frame which accommodates a permanent magnet as well as an electric coil interacting with the permanent magnet. In order to achieve a perfect magnetic screening effect, the range of the magnet frame carrying the magnetic flux is configured in the shape of a hollow ring in which the permanent magnet is disposed in such a way that its magnetic power flux is split into two partial fluxes directed opposite to each other. In this manner, the electromagnetic system is very effectively screened off outside and inside so that the interior space of the magnet frame is free of magnetic field of force. The interior space may thereby be used for the incorporation of components of the shock absorber valve, components of sensors and other components. The purpose achieved by the division of the power flux is that the wall thicknesses of the grounding means constituted by the magnet frame may be considerably reduced.

An advantage of the inventive actuating unit is a coil configured as a plunger coil, wherein a coil support is guided in guide slots provided in the lower part of the magnet frame and is positioned outside the magnet. The coil support is connected to a coil form bearing the winding of the electric coil by means of guide pins which extend through openings in the magnet frame. In this configuration, the plunger coil may be radially encircled by the permanent magnet or may radially encircle the permanent magnet.

In a further embodiment of the invention, ring-shaped supporting elements formed of magnetically non-conductive material fix the permanent magnet in position.

In another embodiment of the inventive actuating unit, the electric coil is unmovably positioned in the magnet frame, and the permanent magnet is fixed to the wall range of the magnet frame which radially internally defines the hollow ring and is axially movably guided in guides of magnetically non-conductive material.

In another embodiment of the actuating unit, a safe guidance of the moving coil is achieved in that the coil support of the plunger coil comprises a cylindrical range which is guided in the wall range of the magnet frame radially internally defining the hollow ring.

Another embodiment of the invention operates with a magnetic field of force comparable to the radially magnetized ring-shaped permanent magnet. In this embodiment, the wall range radially internally defining the hollow ring is configured in the shape of a polygon, wherein the front surfaces are axially magnetizable permanent magnets. The permanent magnets are cuboid-shaped, circular disc-shaped or ring segment-shaped.

An especially compact embodiment of the inventive actuating unit is distinguished in that the electric coil is formed by a single-layer winding of metal ribbon. In this embodiment, the metal ribbon may preferably be comprised of a unilaterally insulated strip of copper foil or of a superficially oxidized strip of aluminum foil.

Further details, features and advantages of the invention will be revealed by the following description of six embodiments, making reference to the accompanying drawings.

DETAILED DESCRIPTION OF THE PREFERRED EMBODIMENTS

Figure 1:
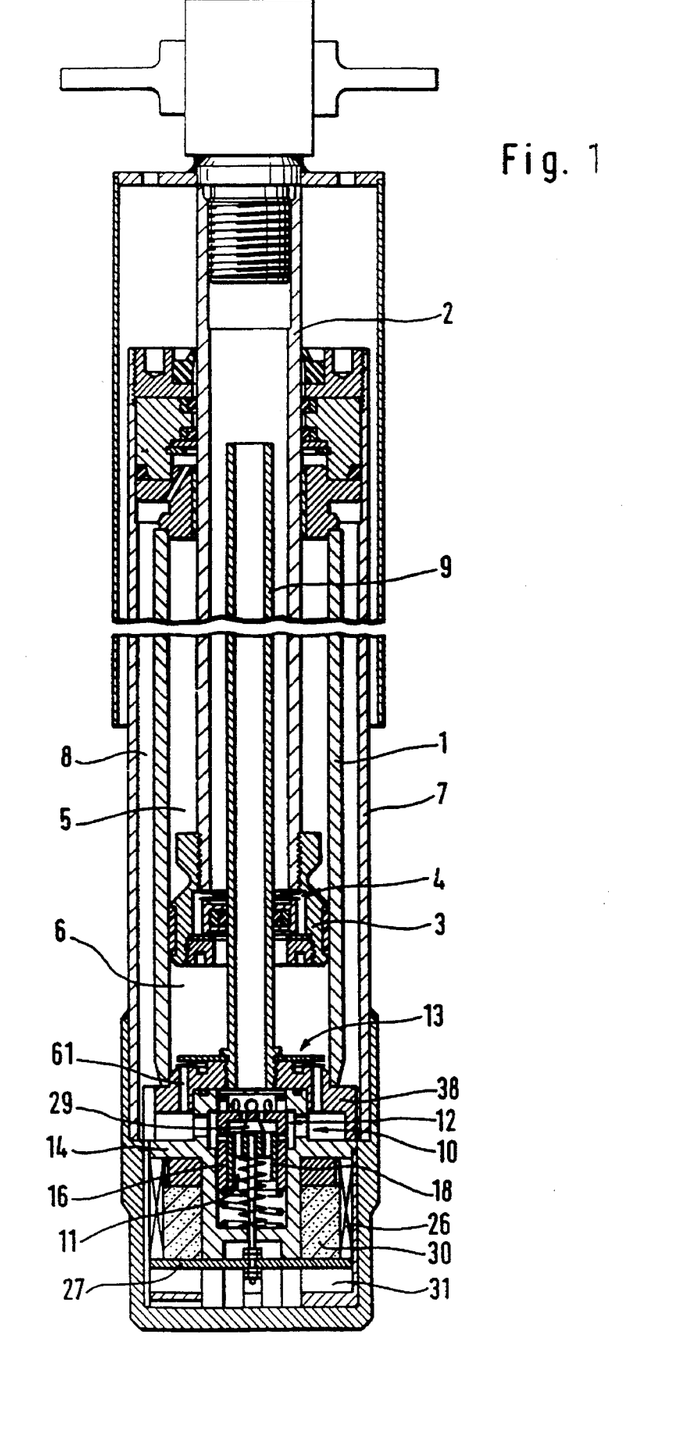
FIG. 1 shows a first preferred embodiment of a two-tube shock absorber with variable absorbing power according to the invention in a sectioned representation.
Figure 2:
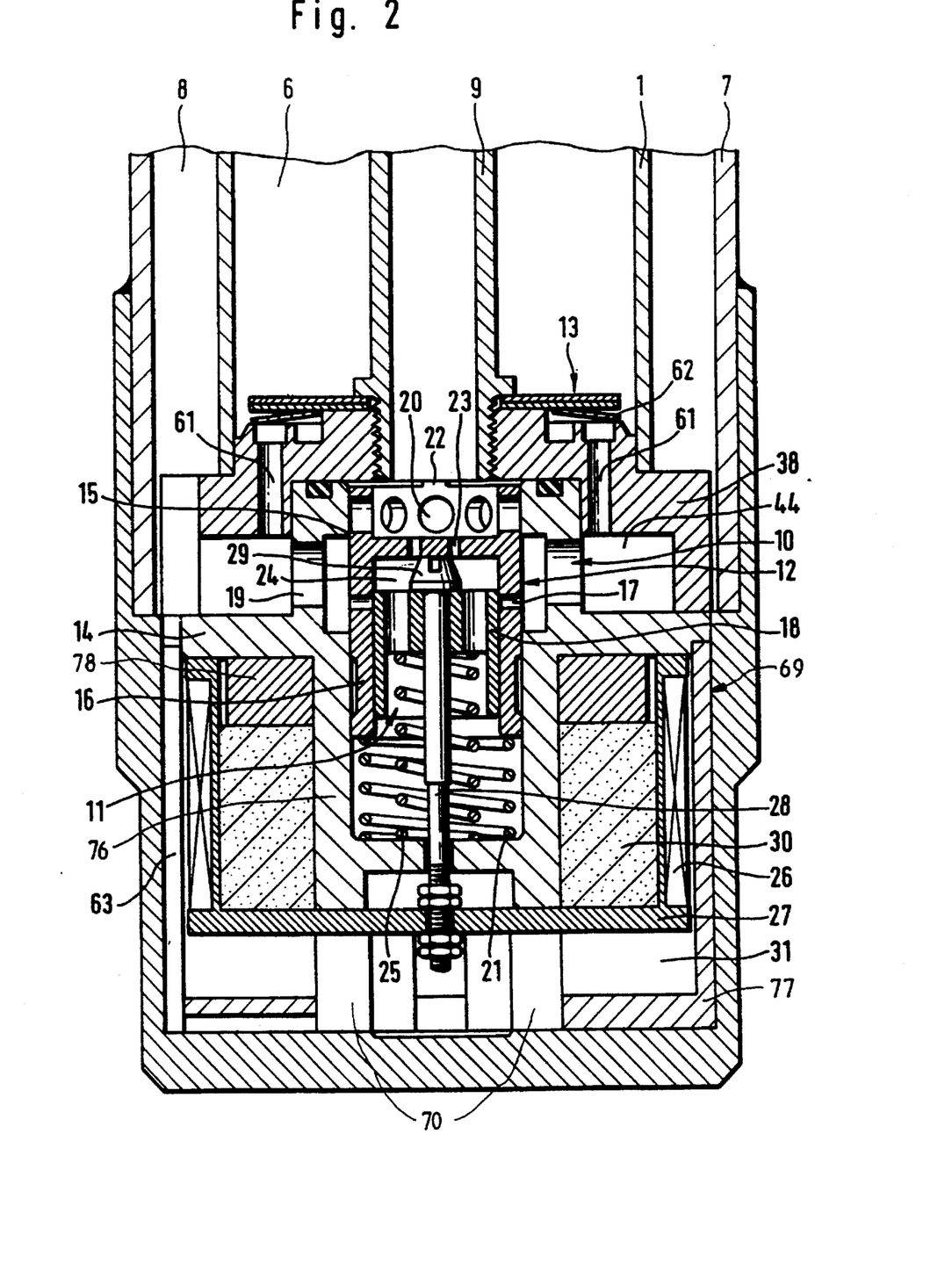
FIG. 2 shows a cross section of the lower range of the two-tube shock absorber illustrated in FIG. 1 with a shock absorber valve in an upscaled representation.

The two-tube shock absorber according to the invention which is illustrated in FIGS. 1 and 2 is furnished with a hollow power cylinder 1 and with an external tube 7 positioned coaxially with said power cylinder 1, so that a storage tank 8 having an annulus-shaped cross section and being partly filled with oil is formed between the power cylinder 1 and external tube 7. The interior space of the power cylinder 1 is subdivided by a piston 3 slidable by a tubular piston rod 2 into a first power chamber 5, which is configured above said piston 3, and a second power chamber 6, which is configured below said piston 3. In this configuration, the piston 3 is provided with a first non-return valve 4 whose function will be explained in the following text. In its central range piston 3 is penetrated by a central tube 9 which projects into the piston rod 2 and which during the operation of the shock absorber affords a compensation of volume between first power chamber 5 and storage tank 8, or between second power chamber 6 and storage tank 8.

At the lower end of the central tube 9, a valve arrangement is formed by a second non-return valve 13 and a shock absorber valve 10 of a preferably two-stage configuration and which serves for the variation of the flow cross-sectional area of the connection between central tube 9 and the storage tank 8. The shock absorber valve 10 is comprised of a preferably electromagnetically actuatable pilot control stage 11 and a main stage 12 which follows the pilot control stage 11 in the upper range of piston speed. In this configuration, the second non-return valve 13 comprises a disc-shaped element 38 which is positioned at the lower end of the power cylinder 1 and in which axially extending bores, shown as ducts 61, are provided which interact with a spring disc 62 enabling their closing or opening. Disc-shaped element 38 defines a hydraulic annular chamber 44 which is in connection with the storage tank 8.

The shock absorber valve 10 comprises a valve housing 14 which is in abutment in an axial direction against the disc-shaped element 38 and which accommodates both the pilot control stage 11 and the main stage 12. The main stage 12 includes a main slide valve 16 which is slidingly guided within the valve housing 14 and which interacts with a control edge 15 configured in the valve housing 14. In this configuration, the control edge 15 is located in proximity to flow-off bores 19 which are in connection with the storage tank 8. In its upper part, the main slide valve 16 is configured open and furnished with a plurality of radial bores 20 which are uniformly distributed over its circumference and which are brought into connection with flow-off bores 19 when the main stage 12 opens. In its position of rest, said main slide valve 16 is in abutment against the end of the central tube 9 under the action of a first compression spring 21 and by means of axial projections 22.

A hydraulic chamber 24 is defined within valve housing 14 which is in connection with the interior space of the central tube 9 through restricting bores 23. Hydraulic chamber 24 is defined in downward direction by a control slide valve 18 which is axially slidingly guided within the main slide valve 16. Hydraulic chamber 24 interacts with control bores 17 configured within the main slide valve 16 in proximity to the flow-off bores 19. Control bores 17 extend in a radial direction. Control slide valve 18 is abutted against the main slide valve 16 under the prestressing action by a second compression spring 25 which is positioned coaxially with the first compression spring 21.

Figure 8:
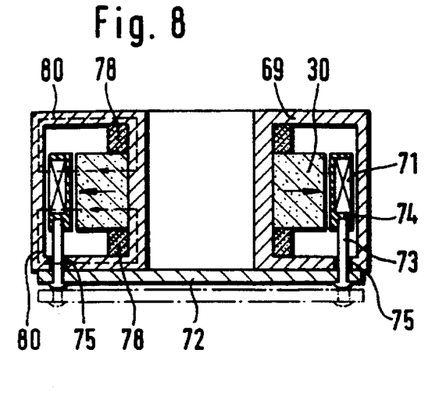
FIG. 8 shows a second embodiment of the electromagnetic actuating unit of the shock absorber valve used in the inventive two-tube shock absorber.

Control slide valve 18 is actuatable by means of an electromagnetic actuating unit which is comprised of a plunger coil 26 and of a permanent magnet 30 which are accommodated in a magnet frame 69 of magnetically conductive material, such as iron. In this embodiment, magnet frame 69 comprises a cylindrical center range 76 of the valve housing 14 and of a cup-shaped screening cage 77. The magnetic flux of force-carrying range of magnet frame 69 is designed as a hollow ring, so that the magnetic flux of force of the radially polarized permanent magnet 30 which is positioned therein is subdivided into two part-fluxes 80 extending in opposite directions to each other (see FIG. 8). Due to these provisions, the wall thickness of the components 76, 77 may be dimensioned only for half the flux density.

As is seen in FIG. 2, the cylindrical center range 76 of the valve housing 14 is furnished in its lower portion with guide slots 70 which serve to guide a plunger coil support 27 which consists of magnetically non-conductive material. In this configuration, the ring-shaped permanent magnet 30 is fastened onto the center range 76 of the valve housing 14 and is fixed axially by means of a ring-shaped supporting element 78. Plunger coil 26 is disposed axially movably in an operating air slot which is configured between the wall of the screening cage 77 and the permanent magnet 30.

A captivating element 28 with whose aid the control slide valve 18 is captivated to the plunger coil 26 is fastened to the plunger coil supporting 27. Captivating element 28 is comprised of a head 29 which in the position of rest is in abutment from below against the main slide valve 16. Beneath the plunger coil support 27 the screening cage 77 defines a hydraulic chamber 31 which is filled with oil and which is in connection with the storage tank 8 through laterally axially extending ducts 63.

The plunger coil 26 of the electromagnetic actuating unit requires to be supplied with electric current in order to safeguard the intended function of the inventive two-tube shock absorber. The electromagnetic actuating power which comes about will generate a downward movement of the control slide valve 18, so that a connection between the storage tank 8 and the interior space of the central tube 9 is created. Now, when the piston 3 moves upward in the traction stage, the pressure existing in the power chamber 5 will become higher than the pressure in the power chamber 6 disposed beneath the piston 3, whereas the first non-return valve 4 will remain closed. As a result, a displacement of the oil will take place by the hollow piston rod 2 out of the chamber 5 into the interior space of the central tube 9 and through the open shock absorber valve 10 into the annular chamber 44. From annular chamber 44, the oil flows through bores, shown as ducts 61, in the disc-shaped element 38 of the second non-return valve 13 into the power chamber 6 which is arranged beneath the piston 3, which is simultaneously refilled from the storage tank 8.

In the event of a movement of the piston 3 in downward direction in the thrust stage, the pressure existing within the power chamber 6 situated beneath the piston 3 will become higher than the pressure within the upper power chamber 5, so that the first non-return valve 4 will be opened. The volumetric stream exiting from the power chamber 6 is divided, more precisely, into a first part-stream which flows through the open first non-return valve 4 directly into the power chamber 5 positioned above the piston 3, and into a second part-stream which flows through the hollow piston rod 2, through the central tube 9 and through the open shock absorber valve 10 into the storage tank 8.

In the operation of the inventive two-tube shock absorber, two operating statuses of the shock absorber valve 10 are distinguished. In the first operating status, which corresponds to a lower range of piston speed in which low pressures and small volumetric streams occur, the shock absorber valve 10 works as a single-stage slide valve wherein electromagnetic actuation determines the opening degree of the pilot control stage 11.

In the second operating status, which corresponds to an upper range of piston speed in which more elevated pressures and larger volumetric streams occur, the control slide valve 18 is positioned by the plunger coil 26 which is supplied with electric current, exactly as in the first operating status. The control slide valve 18 position is preestablished by an equilibrium between the force of the second compression spring 25, the actuating power of the plunger coil 26, the force resulting from the pressure differential between the pressure existing within the main slide valve 16 and the pressure within the storage tank and acting on the captivating element 28, and hydrodynamic flow forces occurring in the range of the mouth of the control bores 17. When the control bores 17 are closed, the pressure existing within the main slide valve 16 equals the system pressure, so that the main stage 12 remains closed by the force of the first compression spring 21. When the control bores 17 are released, due to the flow of oil through the restricting bores 23 at the main slide valve 16, a pressure differential will exist that acts on the front face of the main slide valve 16 to release a force which overcomes the spring force of the first compression spring 21. The force results in a movement of the main slide valve 16 in downward direction. In so doing, the control edge 15, and the flow-off bores 19 will be released. The movement of the main slide valve 16 mentioned above will result in a partial closure of the control bores 17, so that the volumetric stream flowing through the restricting bores 23 will decrease and the pressure differential acting upon the main slide valve 16 will be reduced.

This control process will continue until the spring force of the first compression spring 21 overcomes the force resulting from the pressure differential and will close the main stage 12. Due to this mechanism, the position of the main stage 12 is coupled hydraulically to the position of the pilot control stage 11, the actuating energy needed for the motion of the main slide valve 16 being taken from the flow which has to be throttled. In the upper range of piston speed, the shock absorber valve 10 works as a two-stage pressure limiting valve. The electromagnetic actuation determines the level of the pressure differential at the main slide valve 16.

The continuous transition between these operating ranges may be modelled by the suitable dimensioning of the components and almost optional bands of characteristic curves, which may be generated as characteristic of the shock absorber valve. In particular, a soft set-off of the valve characteristic curves in the lower operating range is rendered possible in this way, which corresponds to a more comfortable setting of the shock absorber in case of its application in controllable vehicle shock absorbers. In the upper operating range, the degressivity of the characteristic curves is essentially determined by the cross-sectional area of the captivating element 28 at its point of penetration into the valve housing 14.

Figure 3:
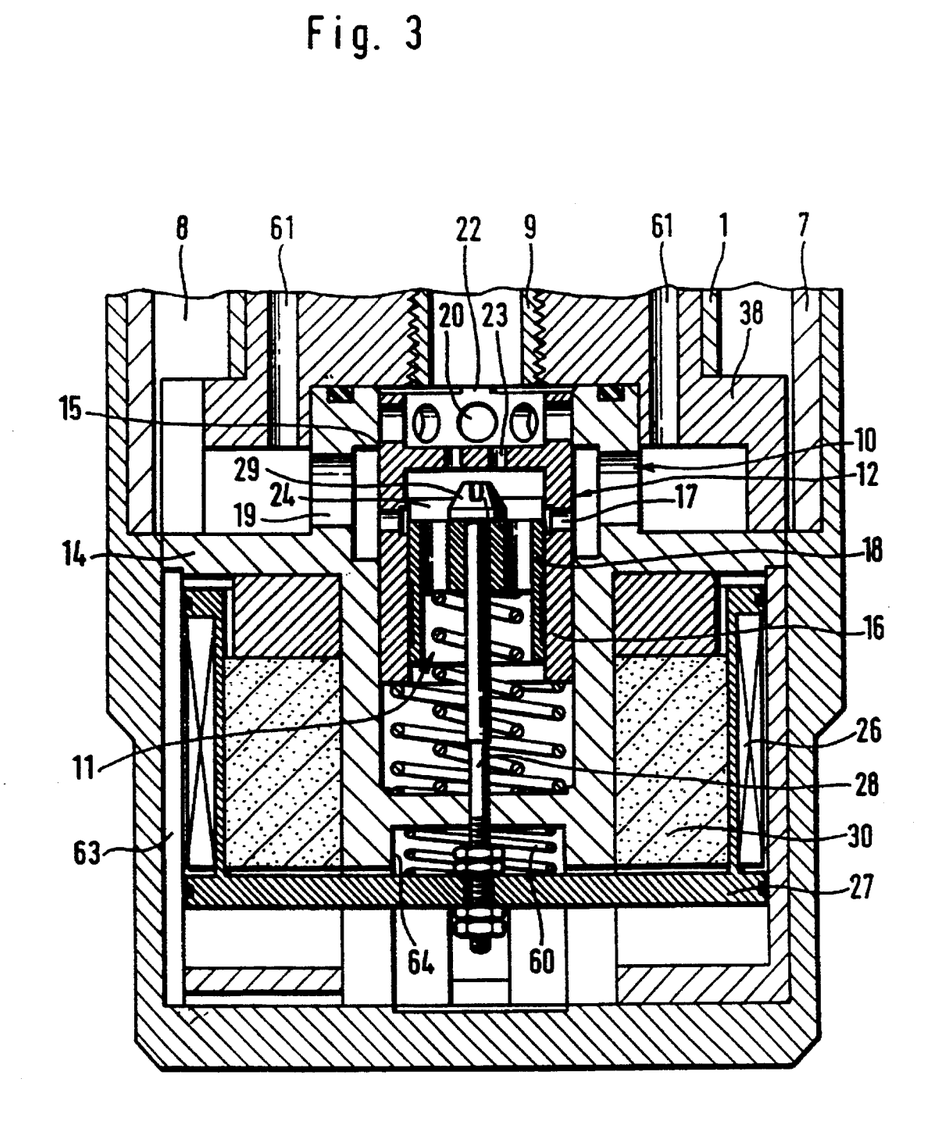
FIG. 3 shows a second embodiment of the invention in a cross-sectional representation corresponding to FIG. 2.

In the second embodiment of the invention which is illustrated in FIG. 3, an intermediate position of the control slide valve 18 is shown in the condition of rest of the shock absorber. In this position, the control bores 17 are partially covered by the control slide valve 18. According to the invention, the intermediate position is reached by the action of a third compression spring 60 which counteracts the second compression spring 25 prestressing the control slide valve 18 in the closing direction. Third compression spring 60 is positioned in a cylindrical recess 64 configured in the valve housing 14, coaxially with the captivating element 28 in such a manner that it takes support at the plunger coil support 27.

Figure 4:
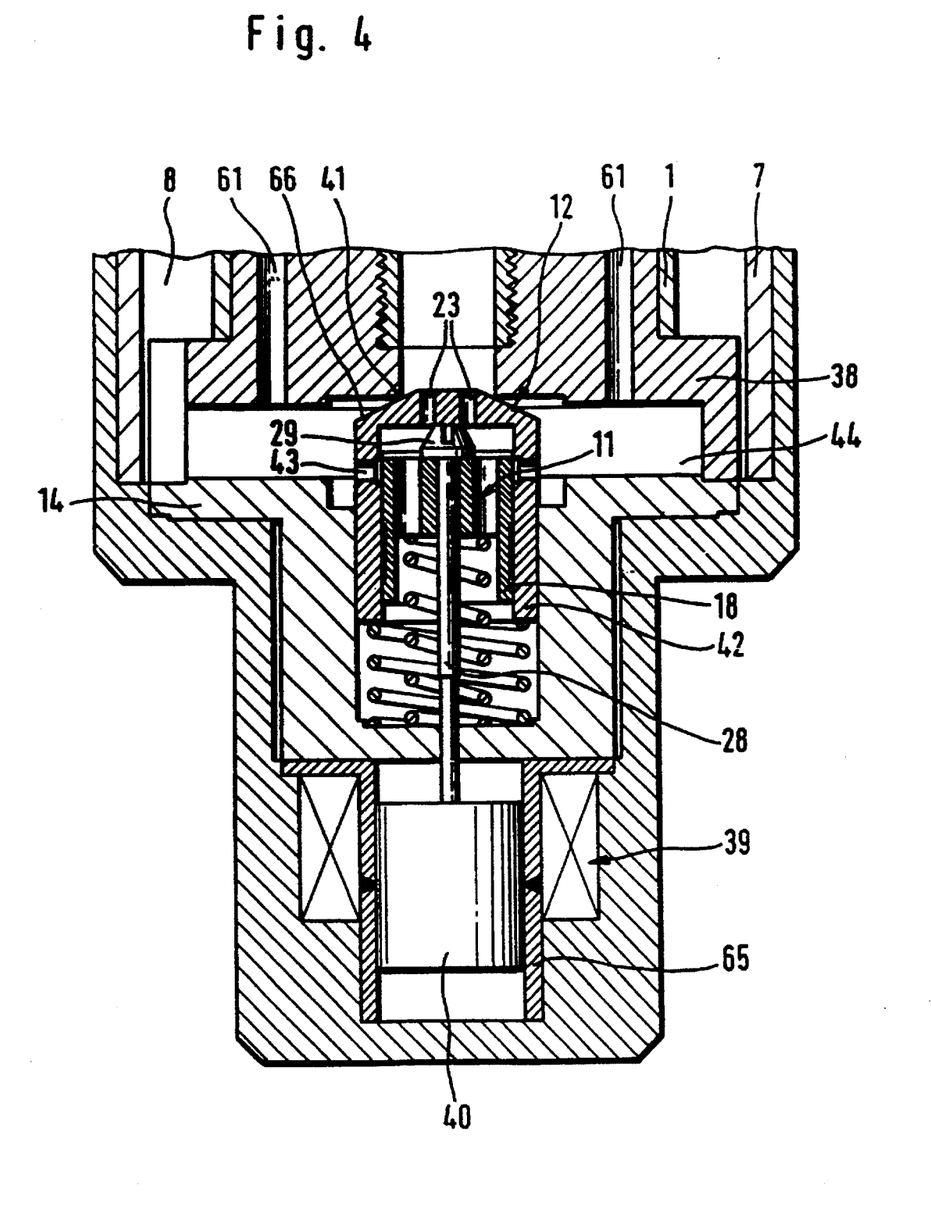
FIG. 4 shows a third embodiment of the invention in a cross-sectional representation corresponding to FIG. 2.

In the third embodiment of the inventive two-tube shock absorber illustrated in FIG. 4, the actuation of the pilot control stage 11 takes place by means of a proportional magnet 39 whose armature 40 is slidingly guided within a tubular coil support 65 and is connected by the captivating element 28 to the control slide valve 18. In this configuration, the main stage 12 is preferably furnished with a valve piston 42 which is provided with two restricting bores 23 as well as with a plurality of control bores 43. Valve piston 42 includes a conical sealing surface 66 which interacts with a ring-shaped sealing seat 41 configured at the disc-shaped element 38 of the second non-return valve 13. Due to the use of the proportional magnet 39, a favorable weight per unit of power of the pilot control stage 11, i.e. a favorable ratio between the maximum magnetic force and the weight of the actuating unit, is achieved while the main stage 12, which is configured in the shape of a seat valve, operates virtually free of leakage.

Figure 5:
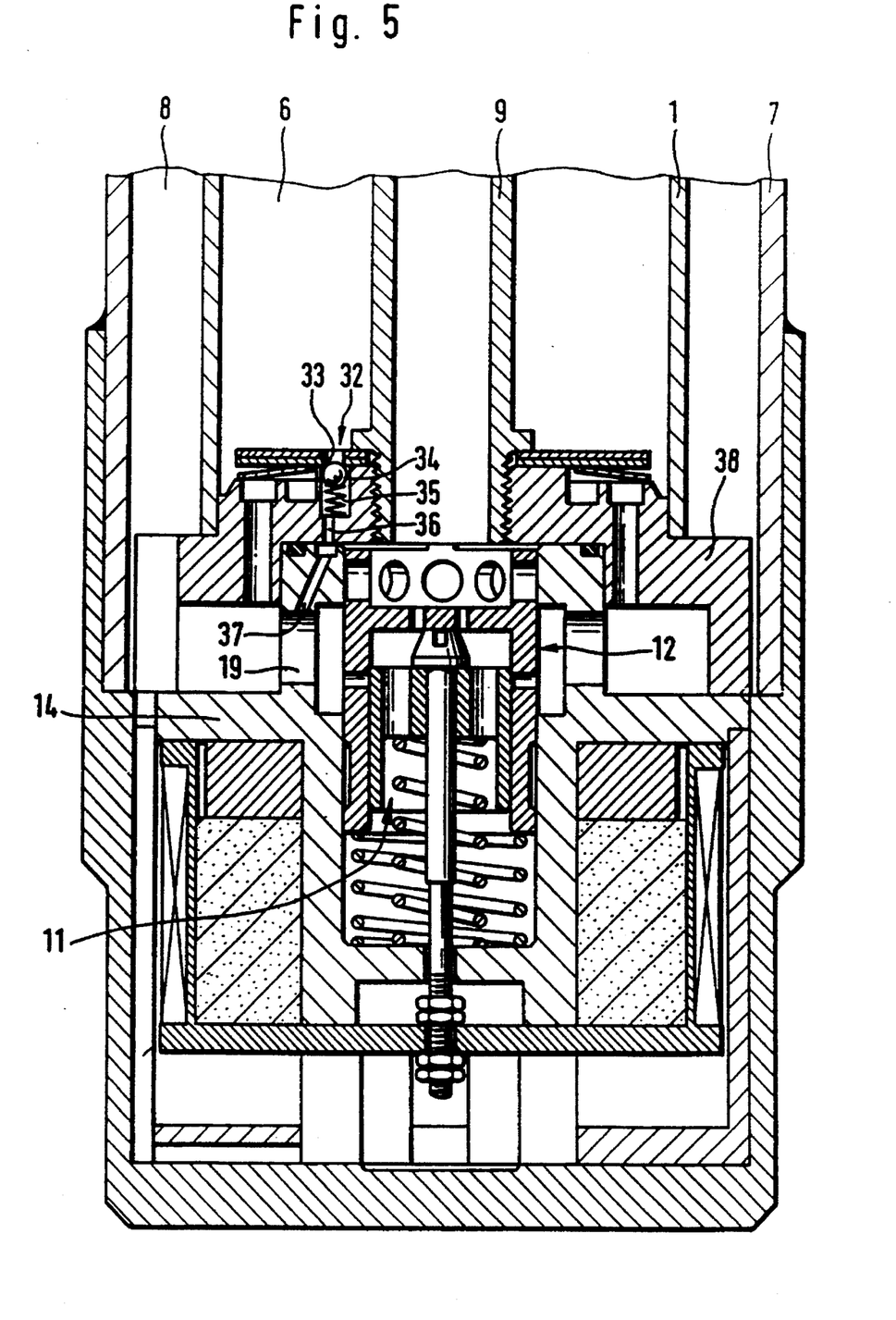
FIG. 5 shows a fourth embodiment of the invention which is slightly modified with respect to the first embodiment illustrated in FIG. 1, in a cross-sectional representation corresponding to FIG. 2.

In the event of a failure, or of a faulty control action upon the shock absorber valve 10 in the pressure stage to eliminate inadmissibly elevated shock absorbing power levels, a non-controllable valve 32, preferably a non-return valve, is shown in FIG. 5 parallel to the main stage 12, and to the pilot control stage 11. In the event of exceeding the admissible system pressure, non-controllable valve 32 opens up a connection between the power chamber 6 positioned beneath the valve piston 3, on one hand, and the storage tank 8, on the other hand. Valve 32 is, in this context, preferably positioned in the disc-shaped element 38 of the second non-return valve 13 and is comprised of a ball 34, which is prestressed by means of a spring 35, and a ring-shaped sealing seat 33 which interacts with said ball 34. The connection is formed by bores 36, 37 in the disc-shaped element 38, and in the valve housing 14, respectively. The latter bore 37 ends in one of the flow-off bores 19.

Figure 6:
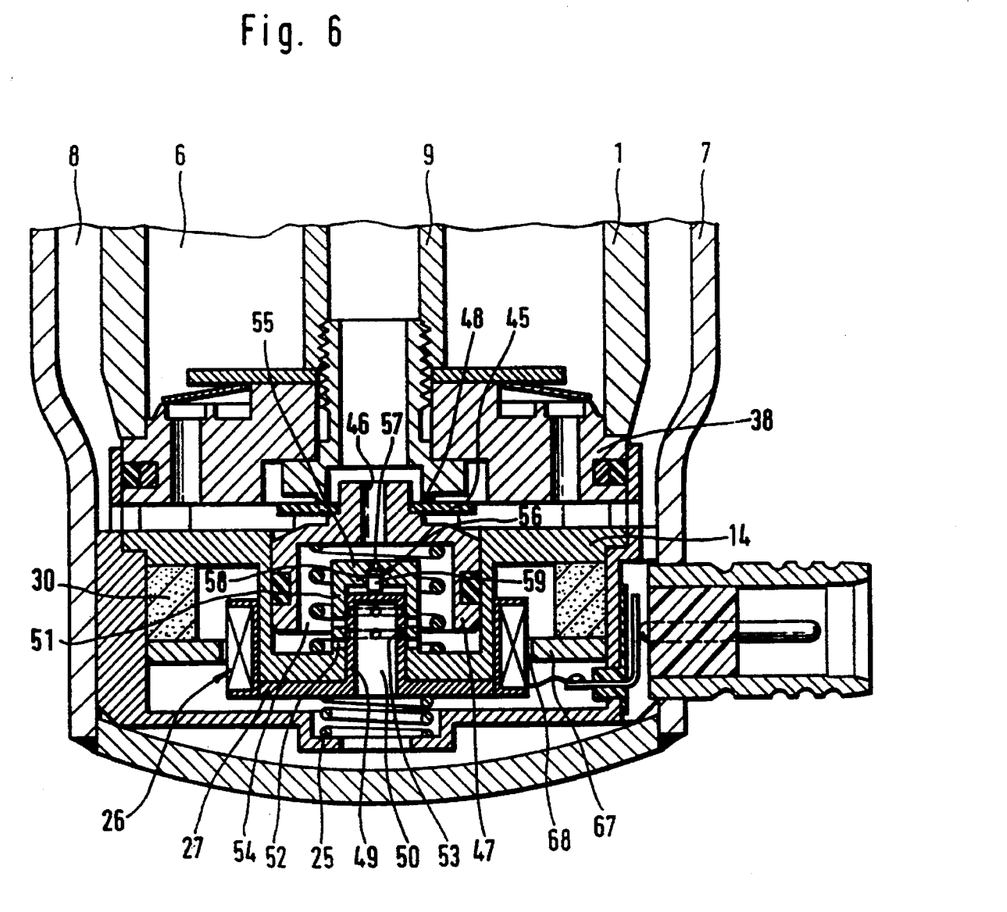
FIG. 6 shows a fifth preferred embodiment of the inventive two-tube shock absorber in a cross-sectional representation corresponding to FIG. 2.
Figure 7:
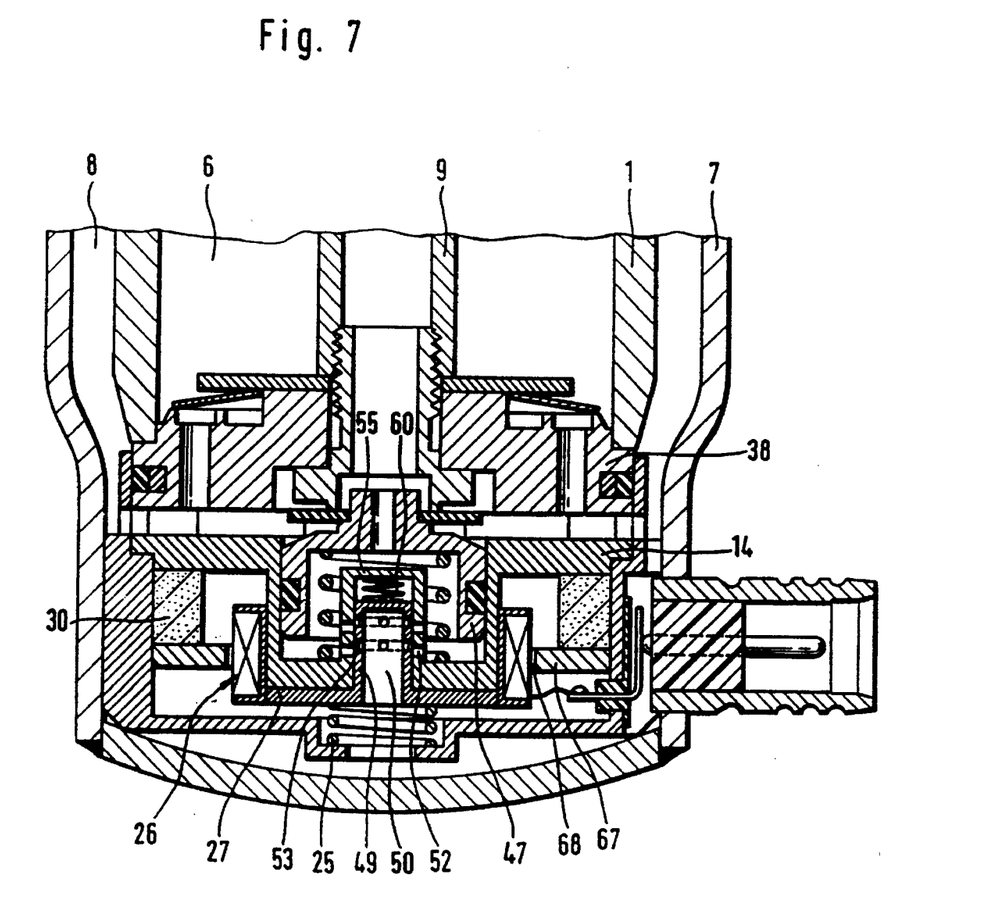
FIG. 7 shows a sixth preferred embodiment of the inventive two-tube shock absorber in a cross-sectional representation corresponding to FIG. 2.

In the embodiments of the invention illustrated in FIGS. 6 and 7, the actuating unit of the pilot control stage is formed by a plunger coil 26 similar to the embodiment of FIGS. 1 and 2. Plunger coil interacts with a permanent magnet 30 located radially externally. The valve housing 14, presenting a two-part configuration, is furnished in its interior space with a ring-shaped plate 67 which is abutted, on one side, against the permanent magnet 30. Valve housing 14 is formed, on the other side, with a central opening 68 which accommodates the plunger coil 26. In this arrangement, the control slide valve 49 of the pilot control stage is preferably comprised of a central cylindrical range of the plunger coil support 27 which is guided in an axially extending cylindrical wall 51 of the valve housing 14 defining a hydraulic chamber 50 which is in constant connection with the storage tank 8 and is formed with radial bores 52. Bores 52 interact with control bores 53 which are configured in the control slide valve 49 and afford a link between the chamber 50 and a chamber 54 which is configured in the valve housing 14 and which is defined by a piston 47 sealedly and axially slidingly guided within the valve housing 14. The chamber 50 is defined at the top by a horizontally extending wall 55 which closes the cylindrical wall 51 and which is provided with a stepped bore 56. Stepped bore 56 is in this context preferably configured such that a section 57 of smaller diameter ends up in the chamber 54, whereas a section 58 ending up in the chamber 50 slidingly accommodates a cylindrical thrust member 59 which is in abutment against the control slide valve 49 from above.

At its upper end piston 47 mentioned before bears a circular valve closing plate 45 which interacts with a sealing seat 48 configured in the disc-shaped element 38. In addition, the piston 47 is formed with an axially extending bore 46, which provides a connection between the interior space of the central tube 9 and the hydraulic chamber 54. Both FIGS. 6 and 7 illustrate that the piston 47 jointly with the valve closing plate 45 and the sealing seat 48 forms the main stage of the shock absorber valve mentioned in the foregoing text. In the presence of an actuating power equaling zero, the thrust member 59 affords in this embodiment a partial opening of the shock absorber valve, or of the latter's pilot control stage.

The embodiment illustrated in FIG. 7 corresponds largely to the version which has been described in conjunction with FIG. 6. However, in the condition of rest the pilot control stage of this embodiment is in an intermediate position in which a partial overlapping of the opening ranges in the control slide valve 49 and in the cylindrical wall 51 takes place so that the shock absorber is partially open. In this embodiment, the third compression spring 60 which has been mentioned in connection with FIG. 3 is positioned between the horizontal wall 55 and the control slide valve 49.

FIGS. 8 to 12 show five different embodiments of the electromagnetic actuating unit which can be used in the aforementioned controllable two-tube shock absorber. In the second embodiment, illustrated in FIG. 8, the coil support 72 of the plunger coil 71 is positioned outside the magnet frame 69. The connection between the coil support 72 and a coil form 74 bearing the winding of the plunger coil 71 is achieved by means of guide pins 73. Guide pins 73 are passed through openings 75 configured in the bottom of the magnet frame 69. As further shown in FIG. 8, the radially polarized ring-shaped permanent magnet 30 is fixed to the center portion of the magnet frame 69, approximately in its middle, by means of two ring-shaped supporting elements 78. As a result, the magnetic flux of force generated by the permanent magnet 30 is subdivided into two part-fluxes 80 which are directed opposite each other in the magnet frame 69, so that a symmetrical homogenous magnetic field of force will result in the operating-air slot which is defined by the permanent magnet 30 and by the vertical wall of the magnet frame 69.

Figure 9:
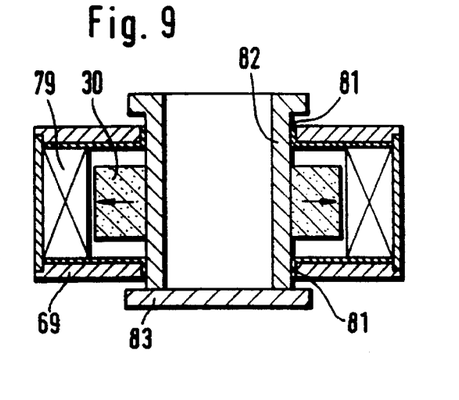
FIG. 9 shows a third embodiment of the electromagnetic actuating unit of the shock absorber valve used in the inventive two-tube shock absorber.

In the third embodiment of the inventive actuating unit, illustrated in FIG. 9, the electric coil 79 is unmovably positioned in the magnet frame 69. The ring-shaped permanent magnet 30 is fixed to the cylindrical wall range 82. Cylindrical wall range 82 defines the magnet frame 69 radially internally and is axially slidingly guided in guides 81 made of magnetically non-conductive material. When the electric coil 79 is supplied with electric current, a force which is proportional to the current intensity and direction will be generated at a plate 83 closing the cylindrical wall range 82. The force results in a slide in the axial direction of cylindrical wall range 82 together with the permanent magnet 30.

Figure 10:
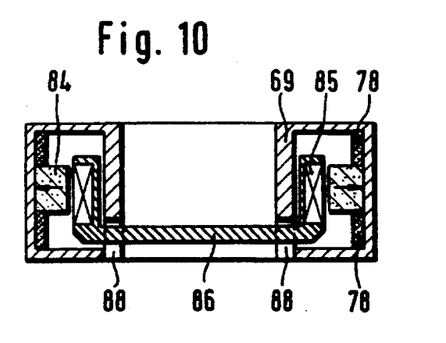
FIG. 10 shows a fourth embodiment of the electromagnetic actuating unit of the shock absorber valve used in the inventive two-tube shock absorber.

In the fourth embodiment shown in FIG. 10, the radially polarized permanent magnet 84 is arranged centrically at the internal side of the radially external wall of the magnet frame 69 and is positioned by means of two supporting elements 78. A coil support 86 for the plunger coil 85 is guided in a manner similar to the embodiments according to FIG. 2 and FIG. 3, in guide slots 88 which are configured in the lower range of the magnet frame 69. Plunger coil 85 is radially encircled by the permanent magnet 84. As a result, a more rational utilization of the magnet material is rendered possible while the external dimensions remain unvaried.

Figure 11:
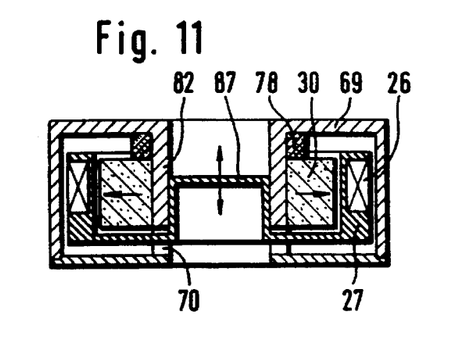
FIG. 11 shows a fifth embodiment of the electromagnetic actuating unit of the shock absorber valve used in the inventive two-tube shock absorber.

In the fifth embodiment illustrated in FIG. 11, an improvement of the guidance of the plunger coil 26 in the cylindrical wall range 82 is shown. The cylindrical wall range 82 defines the radially internal portion of the magnet frame 69. The plunger coil support 27 of the plunger coil 26 radially encircles the permanent magnet 30. The coil support 27 is furnished with a central, cylindrically configured range 87 which projects into the cylindrical wall range 82 of the magnet frame 69. The coil support 27 external diameter corresponds to the internal diameter of the wall range 82.

Figure 12:
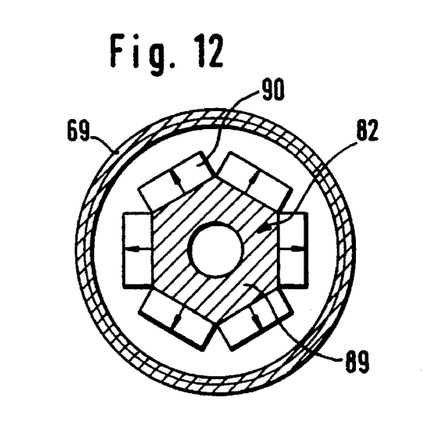
FIG. 12 shows a sixth embodiment of the electromagnetic actuating unit of the shock absorber valve used in the inventive two-tube shock absorber.

FIG. 12, finally, shows a sixth embodiment of the inventive actuating unit in which the wall range 82 radially inwardly defining the magnet frame 69 is configured in the shape of a polygon. The polygon is shown in the shape of a hexagon 89. The magnetic field of force existing in the magnet frame 69 is generated by a plurality of cuboid-shaped, axially magnetized partial magnets 90 which are fastened to the front surfaces of the hexagon 89. Alternatively, magnets 90 may be shaped as circular discs, or as ring segments.

Figure 13:
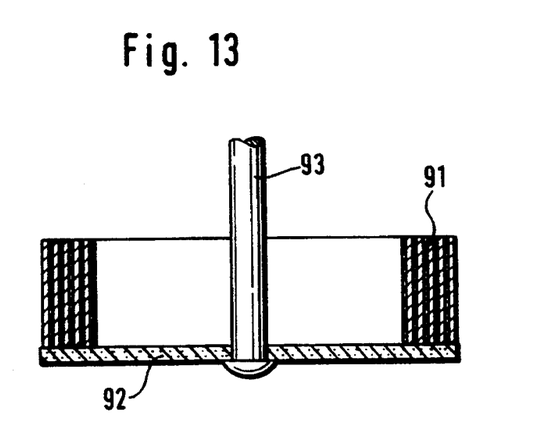
FIG. 13 shows a further embodiment of the electric coil used in the electromagnetic actuating unit.

FIG. 13 shows a coil arrangement which may be used in the embodiments of the electromagnetic actuating unit according to the invention which have been described before. On the plate-shaped coil support 92 formed of magnetically non-conductive material, a single-layer winding 91 of metal ribbon is disposed. Winding 91 is preferably comprised of a unilaterally insulated strip of copper foil or by a strip of aluminum foil which has superficially been oxidized. The layer of oxide will then form the electrical insulation of one of the windings with respect to the other. The coil support 92 may preferably be furnished with a guide pin 93 which is disposed in its center and which may, for example, serve for the transmission of an actuating force to relevant components of the shock absorber valve. A coil arrangement of this kind may also be used for magnet systems according to FIG. 9 in which the electric coil is disposed unmovably.

We claim:

1. A two-tube shock absorber with controllable variable shock absorbing power, comprising:

a power cylinder having interior space subdivided into a first and a second power chambers by a piston, said piston being slidable by a piston rod;

a storage tank partly filled with oil, said storage tank having a plurality of hydraulic connections which afford a compensation of volume between said power chambers and said storage tank, a first and a second non-return valves, and a shock absorber valve, said shock absorber valve providing the variation of the cross-sectional area of flow of one of said hydraulic connections, said shock absorber valve forming a pilot control stage and a main stage, wherein in a lower range of piston speed the shock absorbing power is exclusively determined by the variable flow cross-sectional area of said pilot control stage, said main stage remaining closed, and wherein in an upper range of piston speed the shock absorbing power is determined by the variable flow cross-sectional areas both of said main stage and of said pilot control stage.

2. A two-tube shock absorber as claimed in claim 1, wherein said main stage follows the position of said pilot control stage in the upper range of piston speed.

3. A two-tube shock absorber as claimed in claim 2, wherein said main stage and said pilot control stage are arranged so as to be separate from said second non-return valve in a valve housing, said main stage including a main slide valve interacting with a control edge which is configured within said valve housing and said pilot control stage including an electromagnetically actuatable control slide valve interacting with a plurality of control bores configured in said main slide valve.

4. A two-tube shock absorber as claimed in claim 3, wherein said control edge is positioned in proximity to a plurality of flow-off bores configured in said valve housing, said flow-off bores being in connection with said storage tank.

5. A two-tube shock absorber as claimed in claim 4, wherein said main slide valve is configured open in said upper range, said main slide valve being furnished with a plurality of bores which connect said main slide valve with said flow-off bores.

6. A two-tube shock absorber as claimed in claim 3, wherein said main slide valve is prestressed in the closing direction of said main stage by means of a first compression spring, said main slide valve being in abutment against a stop in a condition of rest.

7. A two-tube shock absorber as claimed in claim 6, wherein said main slide valve includes an axial projection, said axial projection abutting said stop.

8. A two-tube shock absorber as claimed in claim 3, wherein said main slide valve is provided with a plurality of restricting bores which end up in a hydraulic chamber defined within said valve housing of said main slide valve.

9. A two-tube shock absorber as claimed in claim 3, wherein said control slide valve is guided in said main slide valve and is abutted against said main slide valve in a condition of rest under the prestressing action provided by a second compression spring.

10. A two-tube shock absorber as claimed in claim 3, wherein said pilot control stage is actuatable electromagnetically by a plunger coil which interacts with a permanent magnet, and wherein said control slide valve is captivated to a plunger coil support by a captivating element, a head of said captivating element being in abutment against said main slide valve in a condition of rest.

11. A two-tube shock absorber as claimed in claim 10, wherein an actuating unit is comprised of said plunger coil and said permanent magnet, said permanent magnet positioned in a hydraulic chamber which is in connection with said storage tank, so that the end of said captivating element is fixed to said plunger coil support and is subject to the pressure existing within said storage tank.

12. A controllable shock absorber as claimed in claim 3, wherein the mode of functioning in the upper range of piston speed corresponds to the mode of functioning of a two-stage pressure limiting valve, the electromagnetic actuation of said pilot control stage determining the level of pressure differential at said main slide valve.

13. A two-tube shock absorber as claimed in claim 1, wherein a non-controllable valve is provided parallel to one of said main stage and said pilot control stage, said non-controllable valve being active exclusively in a thrust stage of the shock absorber.

14. A two-tube shock absorber as claimed in claim 13, wherein said non-controllable valve is configured in the range of said second non-return valve, said non-controllable valve including a ball, said ball interacting with a valve seat, said non-controllable valve being prestressed by a spring.

15. A two-tube shock absorber as claimed in claim 13, wherein said non-controllable valve is arranged in a connection between said second chamber and said storage tank, said main stage and said pilot control stage being arranged in a valve housing, with a plurality of flow-off bores configured in said valve housing, wherein said connection is formed by a bore in a disc-shaped element of said second non-return valve, and a bore in said valve housing, said valve housing bore ending up in one of said flow-off bores.

16. A two-tube shock absorber as claimed in claim 1, wherein said main stage includes a main slide valve and said pilot control stage includes a control slide valve actuatable electromagnetically, the electromagnetic actuation being achieved by a proportional magnet, said magnet having armature connected to said control slide valve by a captivating element, a head of said captivating element being abutted against said main slide valve in a condition of rest.

17. A two-tube shock absorber as claimed in claim 1, wherein said main stage and said pilot control stage are arranged within a valve housing so as to be separate from said second non-return valve, said main stage including a valve piston interacting with a sealing seat which is configured as a disc-shaped element of said second non-return valve, and said pilot control stage including an electromagnetically actuatable control slide valve interacting with a plurality of control bores configured in said valve piston.

18. A two-tube shock absorber as claimed in claim 17, wherein said disc-shaped element and said valve housing define a hydraulic annular chamber into which said valve piston projects and which is in connection with said storage tank.

19. A two-tube shock absorber as claimed in claim 18, wherein said control bores connect with said annular chamber.

20. A two-tube shock absorber as claimed in claim 1, wherein said main stage and said pilot control stage are positioned within a valve housing so as to be separate from said second non-return valve, said main stage including a piston sealedly guided within said valve housing, said piston bearing a valve closing plate, said piston having an axial bore, said main stage having a sealing seat shut off and released by said valve closing plate and which is configured as a disc-shaped element of said second non-return valve, said pilot control stage including a cylindrical chamber configured in said valve housing, said pilot control stage accommodating a control slide valve elastically prestressed in the closing direction wherein an axially extending cylindrical wall is provided with radial bores interacting with control bores configured in said control slide valve to afford a hydraulic link between said storage tank and a chamber, said chamber being defined by said piston within said valve housing.

21. A two-tube shock absorber as claimed in claim 20, wherein said pilot control stage is actuatable electromagnetically by an actuating unit, said unit comprising said control slide valve being configured with a support member of a plunger coil.

22. A two-tube shock absorber as claimed in claim 20, wherein a horizontally extending wall is provided which defines said cylindrical chamber and which is formed with a stepped bore, said bore having a small diameter section in said chamber defined by said piston within said valve housing, and said bore having a larger diameter section which accommodates an axially slidable thrust member which interacts with the front face of said control slide valve.

23. A two-tube shock absorber as claimed in claim 20, wherein a partial connection exists between said chamber defined by said piston within said valve housing and said storage tank, said partial connection existing when said control slide valve is in an intermediate position in a condition of rest.

24. A two-tube shock absorber as claimed in claim 23, wherein said intermediate position of said control slide valve is achieved by a third compression spring which counteracts a second compression spring prestressing said control slide valve.

25. A controllable two-tube shock absorber as claimed in claim 24, wherein said third compression spring is clamped between a booster housing and a plunger coil support.

26. A shock absorber as claimed in claim 25, wherein said third compression spring is positioned in a cylindrical recess in said valve housing.

27. A two-tube shock absorber as claimed in claim 20, wherein a third compression spring is supported at a horizontal wall defining said cylindrical chamber.

28. A controllable shock absorber as claimed in claim 1, wherein the mode of functioning in the lower range of piston speed corresponds to the mode of functioning of a single-stage slide valve whose electromagnetic actuation determines the degree of opening of said pilot control stage.

* * * * *